United States Patent [19]

Rigler et al.

[11] Patent Number: 4,609,512

[45] Date of Patent: Sep. 2, 1986

[54] PROCESS FOR CONTROLLING BEAD SIZE IN THE MANUFACTURE OF EXPANDABLE STYRENE POLYMERS BY SUSPENSION POLYMERIZATION

[75] Inventors: Josef K. Rigler, Recklinghausen; Dirk Reese; Horst Leithäuser, both of Marl, all of Fed. Rep. of Germany

[73] Assignee: Chemische Werke Hüls AG, Marl, Fed. Rep. of Germany

[21] Appl. No.: 644,253

[22] Filed: Aug. 27, 1984

[30] Foreign Application Priority Data

Sep. 1, 1983 [DE] Fed. Rep. of Germany ....... 3331569

[51] Int. Cl.$^4$ .............................. C08J 9/22; C08J 9/20
[52] U.S. Cl. ................. 264/53; 264/DIG. 9; 264/DIG. 15; 521/56
[58] Field of Search ............. 521/56; 264/53, DIG. 9, 264/DIG. 15

[56] References Cited

U.S. PATENT DOCUMENTS 3,462,380 8/1969 Ronden et al. ................. 521/56
4,361,656 11/1982 Mostafa ........................... 521/56 X

FOREIGN PATENT DOCUMENTS 2510937 9/1976 Fed. Rep. of Germany .

Primary Examiner—Philip Anderson
Attorney, Agent, or Firm—Wells & Wells

[57] ABSTRACT

A process for controlling bead size in the manufacture of expandable styrene polymers by suspension polymerization, wherein, referred to the aqueous phase, a concentration of ions of calcium, aluminum, metals of the 1st, 2nd, or 6th through 8th side groups of the period table of elements of $3\times10^{31}$ $^5$ to $3\times10^{-2}\%$ by mass is established, these metal ions being present as cations in the higher oxidation stage of water-soluble, inorganic salts.

16 Claims, No Drawings

PROCESS FOR CONTROLLING BEAD SIZE IN THE MANUFACTURE OF EXPANDABLE STYRENE POLYMERS BY SUSPENSION POLYMERIZATION

Reference is made to copending application Ser. No. 644,451, of co-inventors Josef Karl Rigler and Dirk Reese filed in the U.S. Patent and Trademark Office on the same day as the present application and having the title "Method for Controlling Bead Size in the Production of Expandable Styrene Polymers by Suspension Polymerization", which discloses a related method for controlling grain size by varying the molecular weight of the protective colloid.

BACKGROUND OF THE INVENTION

The field of the invention is the manufacture of expandable styrene polymers by suspension polymerization and the present invention is particularly concerned with the control of the size and shape of the expandable styrene beads produced.

The state of the art of expandable polystyrene may be ascertained by reference to the Kirk-Othmer, "Encyclopedia of Chemical Technology", 2nd Edition, Vol. 9 (1966), under the section entitled "Foamed Plastics", pages 847–884, particularly pages 852, 853, and 855 where polystyrene is disclosed, and Vol. 19 (1969), under the section entitled "Styrene Plastics", pages 85–134, particularly pages 116–120, where polystyrene foams are disclosed and pages 120, 120 where prior art self-extinguishing polystyrene foams are disclosed and in U.S. Pat. Nos. 4,228,244 and 4,337,319, the disclosures of which are incorporated herein by reference.

U.S. Pat. No. 4,228,244 is incorporated by reference to show the process steps necessary to manufacture molded foam bodies. According to this process, the fine particulate styrene polymers are first heated by means of steam or hot gases to temperatures above their softening points, whereby foaming takes place into discrete particles. This procedure is denoted as pre-foaming. The pre-foamed polystyrenes are then temporarily stored and later further expanded by additional steam heating in a pressure-resistant mold whereby the particles weld into one another to a molded body corresponding to the inside cavity of the mold. This second procedure is denoted as final foaming. The molded object, after final foaming, is cooled inside the mold until the inside temperature drops below the softening point. When the molded object is prematurely removed from the mold, the object deforms. As foam plastics are good insulators, relatively long cooling times are required to cool the mold. The time interval allowing the earliest removal of the molded object without deformation is ordinarily called the "minimum mold dwell time".

U.S. Pat. No. 4,337,319 is incorporated by reference to show the preparation of self-extinguishing, fine particulate, expandable styrene polymers for the manufacture of molded articles.

The state of the art of controlling the size and shape of expandable styrene beads during bead polymerization or suspension polymerization may be ascertained by reference to U.S. Pat. Nos. 3,222,343 and 4,036,794; British Pat. No. 1,226,959; French Pat. No. 2,079,991; West German Published Application No. 2,510,937; the Trommsdorf and Meunster article in Schildknecht: Polymer Processes, Vol. 29, pp. 119–120; Houben-Weyl, Methoden der Organischen Chemie, 4th Ed., Vol. XIV, Part 1, pp. 422 and 425; the Winslow and Matrayek article in Industrial and Engineering Chemistry, Vol. 43 (1951), page 1108, and the article by H. Wennig entitled "On the Colloidal Chemistry of Bead Polymerization" as published In Kunststoffe-Plastics, Vol. 5, (1958), pp. 328–340, the disclosures of which are incorporated herein by reference.

Expandable or foamable styrene polymers essentially are produced by the process of bead polymerization or suspension polymerization in the aqueous phase. Present day conventional suspension stabilizers are organic polymers designated as protective colloids. Furthermore, fine particulate powders such as calcium sulfate, barium sulfate, or calcium phosphate may be used to stabilize the suspension droplets. Such stabilizer systems are termed Pickering stabilizers. A listing of commercially available protective colloids can be found for instance in the article by Trommsdorf & Muenster in Schildknecht: Polymer Processes, Vol. 29, pp 119–120.

Substantial significance is attached to the selection of suitable protective colloids for the following reasons:

(1) Setting narrow grain distributions of definite sizes

Foamable bead polymers find applications depending on bead size: coarse beads (2.5 to 0.8 mm) are used in the manufacture of insulating panels, finer fractions (0.8 to 0.4 mm in diameter) are employed in the manufacture of packing materials. It is necessary therefore that the beads always be obtained within the desired range of grain size in adequate amounts, i.e., in high yields.

The proportion of excessively large or small grains should thereby be as small as possible.

(2) Low inner water content of the beads

As regards the conventional suspension polymerization, a certain amount of water is known to be included in the beads. Polymers with a low content of included water evince, in the foamed condition, a uniform foam structure positively affecting the thermal insulation of the foam panels. Accordingly, a minimized amount of included water, called the inner water, is desired.

(3) Spherical bead shape

Defoamed beads are sought when suspension polymerizing takes place with styrene free of expanding agents due to the better workability thereof. However, when producing expandable styrene polymers, the beads should be as spherical as possible.

(4) Adequate suspension stability throughout the entire polymerization cycle

The suspension used in producing expandable styrene polymers is even more unstable than that of styrene polymers free of expanding agents. Accordingly, considering the present day conventional reactor sizes up to 100 m³, the loss of one batch represents a substantial economic loss. Therefore, phase separation must be assured to be so slow in the case of a malfunction that enough time is available to add a polymerization inhibitor.

Up to the present time, no known suspension system has simultaneously met all of the above requirements. Indeed, many attempts have been made to find a practical way to satisfy all four requirements at the same time. As the disclosed state of the art shows, however, these endeavors were without success.

U.S. Pat. No. 4,036,794 discloses a method using suspension stabilizers which were prepared by the radical polymerization of styrene in the presence of polyvinyl pyrrolidone.

West German Published Application No. 2,510,937 discloses a method wherein the initially low-viscosity system is weakly stabilized by tricalcium phosphate, with post-stabilization a few hours later by means of an aqueous solution of polyvinyl pyrrolidone.

Both methods have the intention of producing styrene polymers with low inner water contents. However, these methods suffer from the drawback that the grain size of the polymer is determined by the point in time at which the organic protective colloid is added.

The accurate determination of the degree of polymerization in heterogeneous mixtures such as are present in suspension polymerization is difficult. Still precise knowledge of the conversion is required for the reproducible setting of the grain spectra because the bead size depends on the particular viscosity of the polymerizing phase at which the protective colloid is added. Furthermore, the polymerizing system remains about two hours in an unsafe operational state, and this feature is especially disadvantageous when using large reactors. Malfunction, for instance agitator failure, especially at the beginning of the polymerization, when most of the styrene is still present, may result in reactor destruction.

British Pat. No. 1,226,959 proposes using two protective colloids, namely polyvinyl alcohol with different degrees of hydroxylation, in order to obtain uniformly large and round beads. As shown in the examples of British Pat. No. 1,226,959, this requires selecting the ratio of styrene to water to be so unfavorable that the method is uneconomical. The method cannot contribute to deliberately controlling the bead grain sizes.

As already mentioned initially, water-insoluble inorganic powders also are used as suspension stabilizers. Calcium phosphates are most commonly used. As a rule, these inorganic compounds are employed with lesser amounts of emulsifiers or surfactants, as disclosed in Houben-Weyl, "Methoden der organischen Chemie", 4th Edition, Vol. XIV, part 1, Macromolecular Substances, page 425. However, compared to the case for organic protective colloids, the application of those systems is restricted, reproducible handling and problem-free suspension polymerization only being possible within a narrow range. The Houben-Weyl reference states on page 422, last paragraph, lines 6 through 8: "Conditions can hardly be stated under which a pulverulent dispersant might be used for a boarder application. The optimal dosage must be precisely observed when combining inorganic compounds with surfactants, batch coagulation being the result both of an excessive and an insufficient dose."

French Pat. No. 2,079,991 discloses how to change the bead shape both by varying the amount of the dispersing agent (protective colloid) and by varying the phase ratio of the aqueous to the organic phases, or also by using a mixture of an organic protective colloid and an inorganic suspension stabilizer. This procedure does not necessarily provide spherical beads or beads with low inner water contents because the dispersing agent is not added to the aqueous phase prior to polymerization. When the dispersing agent is added at the beginning of the polymerization, the grain size cannot be set reproducibly.

Again, similar U.S. Pat. No. 3,222,343 fails to meet the four required conditions listed above.

U.S. Pat. No. 3,222,340 discloses a method for suspension polymerization which is operative in the presence of calcium phosphate acting as the suspension stabilizer. Substantial amounts of a complex forming agent are added to improve the phosphate effectiveness. No teaching of controlling bead size of foamable polystyrene when suspension polymerizing in the presence of organic protective colloids can be inferred from this patent.

SUMMARY OF THE INVENTION

Having in mind the limitations of the prior art it is an object of the present invention to control grain size in the suspension polymerization of styrene, with the suspension being stable throughout the entire polymerizating cycle, to obtain expandable beads with low inner water content and spherical shapes and fine particulate or coarse bead fractions being produced as desired at high yields within the grain sizes from 0.41 to 2.5 mm.

This object is achieved by the present invention wherein a concentration of calcium ions or aluminum ions or ions of the metals of the 1st, 2nd, or 6th through 8th side group of the periodic table of elements of $1\times10^{-5}$ to $3\times10^{-2}\%$ by mass, referred to the aqueous phase, is established in the polymerization substance, the metal ions being present in water-soluble, inorganic salts as cations in the higher oxidation stage.

Preferably the metal ion concentration, referred to the aqueous phase, amounts to $1\times10^{-4}$ to $1\times10^{-2}\%$ by mass.

By mass is meant the weight of the aqueous phase.

By higher oxidation stage is meant the highest oxidation stage of the cation.

By varying the amounts in which these are present, the grain spectrum of the expandable styrene polymers is established as desired and without difficulties in the desired range. It is emphasized in particular that the addition of ions does not increase the content of water included in the foamable beads.

Suitable water-soluble inorganic salts providing these ions are, for instance, calcium chloride, iron (III) chloride, manganese chloride, iron (III) nitrate, iron (III) sulfate, copper nitrate, zinc sulfate, and cobalt (III) chloride. Preferably iron (III) chloride, calcium chloride, or manganese chloride are used.

It is essential that the fundamental salts are watersoluble. Therefore, any tricalcium phosphate or calcium carbonate salts present as suspension stabilizers are unsuitable because they are insoluble in water. Again, ferric oxide ($Fe_2O_3$) when used in large amounts, for instance in proportions of 0.1% by mass referred to the aqueous phase, does not supply enough ions into the aqueous phase. The anion of the salts used may not interfere with the polymerization. Due to the possible interaction with the peroxides present in the system, the cation should be present in the highest oxidation stage and, accordingly, the corresponding salts of the trivalent iron are used.

The salts used in the specific examples are iron (III) chloride.$6H_2O$, $MnCl_2.4H_2O$, and $CaCl_2$.

The concentration ranges used for these salts to produce a predominant grain spectrum of greater than 0.41 to less than 2.5 mm is:

iron (III) chloride .$6H_2O$ $3\times10^{-4}$ to $1\times10^{-1}$ parts/100 parts of $H_2O$;

$MnCl_2.4H_2O$ $3\times10^{-4}$ to $5\times10^{-2}$ parts/100 parts of $H_2O$;

$CaCl_2$ $2\times10^{-4}$ to $5\times10^{-2}$ parts/100 parts of $H_2O$.

In a preferred process, first small amounts of a complexing agent are added to the aqueous phase containing the protective colloid and possibly also a water-insoluble suspension stabilizer, this complexing agent next removing all introduced and possibly interfering foreign ions. Thereupon the desired amount of ions is set by adding the salts in accordance with the present invention.

Suitable complexing agents illustratively are aminopolycarboxylic acids such as ethylenediamine tetra-acetic acid or nitrilo-triacetic acid.

The amount of the complexing agent depends on the amount of the water-soluble, foreign ions introduced and can be as much as 0.5% by weight, referred to the aqueous phase, without interfering with the polymerization. As a rule, the amount of complexing agent ranges from 0.0001 to 0.05, preferably from 0.0005 to 0.02% by weight referred to the aqueous phase.

Preferably hydroxyethylcellulose (HEC) or polyvinyl pyrrolidone (PVP) are used as the water-soluble protective colloids. Other protective colloids can be used also; however, the addition of the protective colloid should not lower the boundary surface tension between styrene and the aqueous phase to less than 18 N/mm$^2$. Using those protective colloids whereby the boundary surface tension does not drop below 18 N/mm$^2$ offers the advantage that they can be added before polymerization begins. As a result, adequate stabilization of the polymerization batch is always assured. In each case round beads are obtained.

The protective colloids are used in concentrations between 0.01 and 0.3% by weight referred to the amount of water, in particular in concentrations between 0.05 and 0.15% by weight. These substances should be clear and fully soluble in water in the stated range of concentration at the polymerizing temperatures from 25° to 125° C.

Preferably, a water-insoluble, inorganic powder is added in addition to the organic protective colloid. Suitable powders are, for instance, fine particulate tricalcium phosphates or barium phosphate. The weight ratio of the organic protective colloid to the inorganic powder is in the range from 1:1 to 1:5, in particular from 1:2 to 1:4.

Together with the remaining components of the stabilizing system, the organic protective colloids are placed into aqueous phase before polymerization begins. The organic phase is added with stirring and then the batch is heated. Therefore the system is adequately stable at any time during the polymerization. Should the agitator malfunction, the aqueous and organic phases will separate so slowly that enough time remains to add a polymerization inhibitor. Styrene polymers are obtained, of which the inner water content is extraordinarily low. It is between 0.3 and 1.0% by weight.

In the process of the present invention, the weight ratio of the organic phase to the aqueous phase is in the range of 0.9:1 to 1.25:1, preferably in the range of about 1:1.

The input materials for the manufacture of the expandable styrene polymer are styrene and mixtures of monomers containing at least 50% by weight of styrene and, additionally, a monomer copolymerizing with styrene, such as alpha-methylstyrene, p-methylstyrene, nuclear halogenated styrenes, acrylonitrile, esters of the acrylic or methacrylic acids of alcohols having 1 to 8 carbon atoms, N-vinyl compounds such as N-vinylcarbazole, or also slight amounts of butadiene or divinylbenzene.

The polymerization is carried out by the bead polymerization method at temperatures from 80° to 130° C. This polymerization is initiated in conventional manner using one or more radical forming substances with the typical amounts of 0.2 to 1, in particular 0.3 to 0.6% by weight being used, referred to the organic phase. Illustratively, t-butylperbenzoate, t-butylperisononanate, di-t-butylperoxide, dibenzoylperoxide or mixtures thereof are suitable radical initiators. Furthermore, the styrene polymers may contain organic halogen compounds acting as flame-retardants, for instance the brominated oligomers of butadiene or of isoprene. Typically representative substances are: 1,2,4,5-tetrabromocyclododecane; 1,2,5,6,9,10-hexabromocyclododecane; brominated polybutadiene with a degree of polymerization, for instance up to 15; 1-(alpha,beta-dibromomethyl)-3,4-dibromocyclohexane. Synergistically acting substances, such as di-t-butylperoxide, dicumylperoxide, poly-o-diisopropylbenzene, etc., may be advantageously added.

Liquid or gaseous organic compounds are used as expanding agents for the process of the present invention, which do not dissolve the styrene polymer and of which the boiling point is below the polymer softening point, for instance aliphatic hydrocarbons such as propane, butane, pentane, hexane, cyclohexane or halogen hydrocarbons such as methyl chloride, dichloridedifluoromethane, trichloromonofluoromethane or 1,2,2-trifluoroethane and 1,1,2-trichloroethane. Mixtures of the expanding agents can also be used. Ordinarily the expanding agents are used in amounts of 2 to 20% by weight, preferably 3 to 12% by weight referred to the monomers.

Moreover, the expandable styrene polymers may contain such additives as dyes, fillers, and regulators for the foam porosity, for instance epoxy alkanes. The expandable styrene polymers following manufacture are present as spheres and in general have a particle diameter from 0.3 to 3 mm, preferably from 0.4 to 2.5 mm. Using the conventional procedures, when in the prefoamed condition, the beads are foamed to completion in molds closed in non hermetic manner and are sintered into foam bodies of which the dimensions correspond to the inner space of the mold used.

EXAMPLES

Polymerization

For each 100 parts by weight of water, the amounts stated in Table 1 of an organic protective colloid, of fine particulate tricalcium phosphate and of $1 \times 10^{-2}$ parts by weight of ethylenediamine tetra-acetic acid are placed into a suitable powder mixer. This mixture of powders then is placed into an agitated vessel already containing 100 parts by weight of fully desalted water. Five minutes before the organic phase is added, the precisely weighed amount of inorganic salt as listed in Table 1 is added to the aqueous phase (E1 through E8), or, as regards E9 and E10, processed further without adding ions.

Thereupon 100 parts of styrene are added with stirring and this styrene contains 0.30 part of dibenzoylperoxide and 0.15 part of 6-butylperbenzoate in dissolved form. This mixture is polymerized for 4 hours at 90° C. and for 6 hours at 115° C., with stirring.

Three hours after the temperature of 90° C. is reached, 7 parts of a mixture of normal pentane and of isopentane is added. After the end of the polymerization, the agitation vessel is emptied and the polymer particles are rid of external water.

The inner water is determined as follows: A sample of the expandable polystyrene is treated for two minutes with methanol to get rid of the external water and then evacuated by means of a suction filter, whereupon counterflow air at 20° C. is blown on it for five minutes. The sample so prepared was titered by the "Karl Fischer" method.

The iron salt used is iron(III)chloride.6H$_2$O; the manganese salt used is MnCl$_2$.4H$_2$O and the calcium salt is CaCl$_2$.

The I value measurement for molecular weight is:

$$I = \left(\frac{\eta}{\eta_o} - 1\right) / C$$

in g/ml measured in 0.2% aqueous solution at 25° C. (according to DIN 53 728).

Table 2 lists Examples on the one hand including procedures with the absence of tricalcium phosphate but also using the preferred method of adding a complexing agent to the aqueous phase (E11 and E12) prior to dosing the ions.

In Examples E13 and E14, the procedure is carried out without prior addition of complexing agents.

Smaller vessels are used for Examples E6, E7, E8, and E10 through E14.

TABLE 1

| Example No. | Molecular weight HEC I (g/ml) | HEC* | TCP** | $\cdot 10^{-4}$ Fe$^{3+}$ | inner water | Yield*** | >2.5 | 2.0 | 1.12 | 0.9 | 0.63 | 0.4 | <0.4 |
|---|---|---|---|---|---|---|---|---|---|---|---|---|---|
| E 1 | 620 | 0.14 | 0.25 | 1.4 | 0.79 | 99.9 | 0.1 | 10.4 | 22.4 | 48.5 | 16.2 | 2.3 | 0.1 |
| E 2 | 620 | 0.14 | 0.25 | 1.8 | 0.65 | 99.6 | 0.2 | 48.2 | 32.5 | 16.5 | 2.0 | 0.4 | 0.2 |
| E 3 | 620 | 0.14 | 0.25 | 1.1 | 0.48 | 99.2 | — | — | 8.2 | 48.5 | 39.2 | 3.3 | 0.8 |
| E 9 | 620 | 0.12 | 0.25 | — | 0.98 | 94.9 | 4.3 | 34.3 | 41.5 | 14.5 | 5.2 | 1.4 | 0.8 |
| E 4 | 476 | 0.17 | 0.30 | 1.4 | 0.43 | 99.0 | 0.4 | 32.5 | 41.2 | 18.4 | 4.8 | 1.7 | 1.0 |
| E 5 | 476 | 0.17 | 0.30 | 1.0 Mn$^{2+}$ | 0.64 | 99.8 | — | — | 0.2 | 18.4 | 54.4 | 26.8 | 0.2 |
| E 6 | 476 | 0.10 | 0.30 | 20 Ca$^{2+}$ | | 96.4 | 0.8 | 3.6 | 11.3 | 11.4 | 38.1 | 32.0 | 2.8 |
| E 7 | 476 | 0.10 | 0.30 | 70 Fe$^{3+}$ | | 94.6 | 4.4 | 4.8 | 25.5 | 36.8 | 23.3 | 4.2 | 1.0 |
| E 8 | 476 | 0.10 | 0.30 | 20 | | 91.8 | 6.3 | 9.7 | 43.2 | 24.5 | 11.2 | 3.2 | 1.9 |
| E 10 | 476 | 0.10 | 0.30 | — | | 95.6 | 1.0 | 4.4 | 9.1 | 8.5 | 31.6 | 41.0 | 4.4 |

*HEC = hydroxyethyl cellulose
**tricalcium phosphate
***yield = % by weight of beads within the grain size range of 2.5 to 0.41 mm

TABLE 2

| Example No. | Molecular weight HEC I (g/ml) | HEC | TCP | ion addition kind | $\cdot 10^{-4}$ | complex forming agent $\cdot 10^{-4}$ | inner water | Yield | >2.5 | 2.0 | 1.12 | 0.9 | 0.63 | 0.4 | <0.4 |
|---|---|---|---|---|---|---|---|---|---|---|---|---|---|---|---|
| E 13 | 476 | 0.10 | 0.30 | Mn$^{2+}$ | 20 | — | | 95.1 | 3.7 | 5.4 | 26.5 | 35.4 | 23.7 | 4.1 | 1.2 |
| E 14 | 476 | 0.10 | 0.30 | Ca$^{2+}$ | 70 | — | | 87.3 | 12.1 | 29.5 | 46.7 | 8.1 | 2.3 | 0.7 | 0.6 |
| E 11 | 620 | 0.07 | — | Fe$^{3+}$ | 2 | 10 | | 86.5 | 12.4 | 13.5 | 36.0 | 23.4 | 10.9 | 2.7 | 1.1 |
| E 12 | 620 | 0.07 | — | — | — | 10 | | 91.3 | 4.8 | 7.2 | 29.0 | 21.4 | 14.3 | 19.4 | 3.9 |

What we claim is:

1. In a process for controlling bead size in the manufacture of expandable styrene polymers by the polymerization of styrene or mixtures thereof with comonomers in aqueous medium having an aqueous phase and an organic phase in the presence of organic protective colloids and radical forming initiators and expanding agents, the improvement comprising:
   (a) adding said organic protective colloids to said aqueous phase;
   (b) adding to said aqueous phase ions of calcium, aluminum, metals of the 1st, 2nd, or 6th through 8th side group of the periodic table of the elements at a concentration of $1 \times 10^{-5}$ to $3 \times 10^{-2}$% by mass, said metal ions comprising water-soluble, inorganic salts present as cations in the higher oxidation stage,
   (c) adding said organic phase to said aqueous phase; and
   (d) carrying out said polymerization.

2. The process of claim 1, wherein said concentration of the metal ions referred to the aqueous phase is $1 \times 10^{-4}$ to $1 \times 10^{-2}$% by mass.

3. The process of claim 2, wherein said water-soluble inorganic salts are selected from the group consisting of calcium chloride, iron (III) chloride, manganese chloride, iron (III) nitrate, iron (III) sulfate, copper nitrate, zinc sulfate, and cobalt (III) chloride.

4. The process of claim 3, further comprising said protective colloid containing an inorganic powder insoluble in water.

5. The process of claim 4, wherein said inorganic powder is tricalcium phosphate.

6. The process of claim 3, wherein the weight ratio of said organic phase to said aqueous phase is 0.9:1 to 1.25:1.

7. In a process for controlling bead size in the manufacture of expandable styrene polymers by the polymerization of styrene or mixtures thereof with comonomers in aqueous medium having an aqueous phase and an organic phase in the presence of organic protective colloids and radical forming initiators and expanding agents, the improvement comprising:
   (a) adding a complexing agent to said aqueous phase for removing interfering foreign ions;
   (b) adding said organic protective colloids to said aqueous phase;
   (c) adding to said aqueous phase ions of calcium, aluminum, metals of the 1st, 2nd, or 6th through 8th side group of the periodic table of the elements at a concentration of $1 \times 10^{-5}$ to $3 \times 10^{-2}$% by mass, said metal ions comprising water-soluble, inorganic salts present as cations in the higher oxidation stage;
   (d) adding said organic phase to said aqueous phase; and (e) carrying out said polymerization.

8. The process of claim 7, wherein said complexing agent is an aminopolycarboxylic acid in a concentration of 0.001 to 0.05 by weight of said aqueous phase.

9. In a process for controlling bead size in the manufacture of expandable styrene polymers by the polymerization of styrene or mixtures thereof with comonomers in aqueous medium having an aqueous phase and an organic phase in the presence of organic protective colloids and radical forming initiators and expanding agents, the improvement comprising:

(a) adding said organic protective colloids to said aqueous phase;

(b) adding a complexing agent to said aqueous phase for removing interfering foreign ions;

(c) adding to said aqueous phase ions of calcium, aluminum, metals of the 1st, 2nd, or 6th through 8th side groups of the periodic table of the elements at a concentration of $1 \times 10^{-5}$ to $3 \times 10^{-2}\%$ by mass, said metal ions comprising water-soluble, inorganic salts present as cations in the higher oxidation stage;

(d) adding said organic phase to said aqueous phase; and (e) carrying out said polymerization.

10. The process of claim 9, wherein said complexing agent is an aminopolycarboxylic acid in a concentration of 0.0001 to 0.05 by weight of said aqueous phase.

11. The process of claim 1, further comprising the addition of flame-retardant compound.

12. In a process for the preparation of shaped bodies based on expanded styrene polymers comprising: the polymerization of styrene or a mixture thereof with at least one monomer copolymerizable therewith, in an aqueous medium having an aqueous phase and an organic phase in the presence of organic protective colloids and radical forming initiators and expanding agents, pre-forming of the resulting expandable particles, aging of the formed particles, and molding thereof in a pressure-resistant mold, the improvement comprising:

(a) adding said organic protective colloids to said aqueous phase;

(b) adding to said aqueous phase ions of calcium, aluminum, metals of the 1st, 2nd, or 6th through 8th side groups of the periodic table of the elements at a concentration of $1 \times 10^{-5}$ to $3 \times 10^{-2}\%$ by mass, said metal ions comprising water-soluble, inorganic salts present as cations in the higher oxidation stage;

(c) adding said organic phase to said aqueous phase; and (d) carrying out said polymerization.

13. The process of claim 12, wherein said concentration of the metal ions referred to the aqueous phase is $1 \times 10^{-4}$ to $1 \times 10^{-2}\%$ by mass.

14. The process of claim 13, wherein said water-soluble, inorganic salts are selected from the group consisting of calcium chloride, iron (III) chloride, manganese chloride, iron (III) nitrate, iron (III) sulfate, copper nitrate, zinc sulfate, and cobalt (III) chloride.

15. The process of claim 14, further comprising said protective colloid containing an inorganic powder insoluble in water.

16. The process of claim 15, wherein said inorganic powder is tricalcium phosphate.

* * * * *